United States Patent Office 3,496,242
Patented Feb. 17, 1970

3,496,242
OXYCHLORINATION OF MIXED HYDROCARBONS
Sidney Berkowitz, Highland Park, and Morton Meadow, Trenton, N.J., assignors to FMC Corporation, New York, N.Y., a corporation of Delaware
No Drawing. Filed Aug. 30, 1967, Ser. No. 664,301
Int. Cl. C07c 17/10
U.S. Cl. 260—664      1 Claim

ABSTRACT OF THE DISCLOSURE

A mixture of methane and $C_2$ hydrocarbons is oxychlorinated in the presence of a catalyst consisting essentially of copper chloride and potassium chloride in admixture with a third material (didymium, neodymium, cerium or zirconium chloride) at a temperature from about 350 to 600° C. and preferably between 400 and 500° C.

BACKGROUND OF THE INVENTION

Field of the invention

The invention covers the oxychlorination of methane in admixture with $C_2$ hydrocarbons to produce a mixture of chloroform, trichloroethylene, perchloroethylene and minor products.

Description of the prior art

U.S. Patent 3,260,678 discloses and claims a catalyst composition particularly suitable for oxychlorination reactions comprising a combination of cupric chloride, and alkali metal chloride and didymium chloride on a silica gel catalyst.

U.S. Patent 3,210,431 discloses the oxychlorination of ethylene with this and similar catalysts.

Our copending U.S. patent application Ser. No. 627,855, filed Apr. 3, 1967 discloses a similar catalyst in which the copper chloride and potassium chloride are combined with neodymium chloride. Our U.S. patent application Ser. No. 629,071, filed Apr. 7, 1967 shows a similar catalyst using cerium chloride and our U.S. patent application Ser. No. 664,302, filed simultaneously herewith shows the use of zirconium chloride for this purpose.

While all of these catalysts give commercially acceptable results in the oxychlorination of $C_2$ hydrocarbons with substantially superior results being obtained with the catalysts of our copending applications, substantially poorer results are obtained when methane is used as the feed stream. Two difficulties are encountered. One is that a substantial proportion of the methane of the order of 20% or more, is burned to carbon oxides. A greater problem is occasioned by the fact that some of the methane passes through the reactor unchanged, since it cannot be condensed along with the chlorinated hydrocarbons which result from the process, it ends up as a contaminant in a very dilute gas stream, so that it is substantially impossible to recover the methane and extremely difficult to dispose of it without atmospheric pollution.

SUMMARY OF THE INVENTION

We have now discovered that it is possible to produce chlorinated methanes such as chloroform and carbon tetrachloride in an oxychlorination reaction using a catalyst comprising copper chloride, potassium chloride, and chlorides of a third metal of the group consisting of neodymium, didymium, cerium and zirconium on a carrier, preferably a silica gel carrier, by feeding to the reactor a mixture of methane with ethane and/or ethylene, provided that the molar ratio of methane to the $C_2$ hydrocarbon does not exceed 3:1. Below this ratio, the methane can be completely reacted; at above this ratio of methane, some of it passes through the reactor unreacted.

As described in our copending applications, the preferred catalyst contains the materials on a carrier and the catalyst contains:

(1) at least 1.5 weight percent total of the catalytic metals, copper, potassium, and a third metal calculated as uncombined metals, the weight percent being based on the total weight of uncombined metals and said carrier.

(2) an atomic ratio of metal to copper of at least about 0.4:1 for neodymium; at least 0.09:1 for cerium; and 1:1 for zirconium and didymium.

Description of the invention and the preferred embodiments

The catalyst used for this process is prepared by dissolving the catalytic agents either separately or in combination, and impregnating the carrier with an aqueous solution of the catalytic agents. In practice, the carrier, which is in finely divided form, is simply added to an aqueous solution of catalytic agents. The solution is taken up by the carrier and the carrier is dried. Preferably, the drying involves slow evaporation of water, for example by permitting the catalysts to dry at room temperature for several hours, e.g., 24 hours, followed by complete drying in an oven in which the temperature is gradually raised to about 400° C. over several hours. During the drying stage, the catalytic agents crystallize out within the pores and on the surface of the carrier.

In the above description of the preferred catalyst preparation, the chlorides of the catalytic metals are crystallized on the carrier. However, it should be understood the certain water-soluble salts of these catalytic metals, e.g., the acetates, nitrates, etc. of copper, potassium and cerium, can also be crystallized from aqueous solutions onto the carrier in the same manner as the corresponding chloride salts. The crystallized salts can then be converted to the corresponding metal chlorides while on the carrier by contacting the catalyst and carrier with chlorine or HCl at the temperatures normally used in oxychlorination reactions.

The total amount of catalysts on the carrier is from about 1.5 to 35% by weight, calculated as the uncombined metals, the percent by weight being based on the total weight of the uncombined metals and the carrier. Use of less than about 1.5% does not provide for sufficient catalysis of the above-described reactions; more than about 35% is wasteful since the catalyst operates on the basis of the catalytic surface area available to the reactants and deposition of more than 35% merely results in building up thicker layers of the catalytic salts with no added catalytic effect. It is clear, however, that amounts greater than 35% will operate.

As indicated in my copending applications and in U.S. Patent 3,260,678 the amount of metal present in the catalyst varies over a wide range. In general the atomic ratio of potassium to copper varies from about 0.6:1 to about 2 or 3:1; the atomic range of the added material may be as low as 0.9:1 for cerium, as low as 1:1 for didymium and zirconium, and as high as about 4:1 for any of the catalysts.

As indicated in U.S. Patent 3,260,678, various materials can be used to support the metal chloride, but the most desirable catalyst is silica gel, particularly the microspheroidal type (Grace Chemical Co., Grade 951, silica gel catalyst), having a surface area of at least about 150 m.²/g. and an average pore size of at least about 60 A.

The particle size of the carrier may vary depending upon the type of reactor in which the catalyst is employed. In general, the catalysts may vary in size from 30 to 400 mesh. However, if the catalyst is used in fluid bed reactors (as defined hereinafter) the particle size of the catalyst can range from 10 to 600 microns; microspheroidal particles having an average particle size of 54–65 microns are preferred in fluid bed reactors.

In carrying out the present invention, methane is admixed with ethane, ethylene or a combination of ethane and ethylene as the feed stock together with a chlorine source, for example, hydrogen chloride, and/or chlorine and an oxygen-containing gas, and the mixture is heated to a temperature from 325 to 600° C. Most preferably, the temperature is maintained between 400–450° C. The relative proportions of methane and $C_2$ hydrocarbons fed will depend on the end product mix desired and can include anything up to a ratio of about 3 methane to 1 $C_2$ hydrocarbons. If more methane is used, some of it goes through the reactor unchanged, causing the same difficulties that are obtained when methane is reacted alone. At under a ratio of about 0.25 moles to 1 the handling of the chlorinated methanes becomes burdensome. The amounts of chlorine and oxygen added can be varied over a wide range in known fashion.

The products of the reaction typically are carbon tetrachloride, chloroform, perchloroethylene, together with side products such as water, carbon dioxide, carbon monoxide and the like. The desired chlorinated hydrocarbons are condensed out of the gas stream and separated, and purified by known methods.

In the preferred manner of operation, the oxychlorination reaction is carried out in a fluidized reactor in which both the Deacon and dehydrochlorination reactions occur concurrently. In this process, a chlorine source (hydrogen chloride and/or chlorine), air and a hydrocarbon gas are charged into the bottom of a vertically disposed reactor containing the finely divided catalyst. The force of the upflowing gases lifts the finely divided, particulate catalyst from the base of the reactor and forms a mass of suspended, turbulent catalyst particles supported only by the upflowing gases; this is termed a fluidized bed. The fluidization of the catalyst suitably is initiated with nitrogen and the various reaction gases are then introduced gradually until they reach the proper proportions and reaction commences; recovery of reaction products at the opposite end of the reactor is then started.

Linear gas velocity through the catalyst bed normally is 0.05 to 2.5 feet per second; higher velocities cause undue carry-over of catalyst fines whereas lower velocities do not effect proper fluidization. Where heat must be supplied to the reaction system, common means such as preheating feed gases, electrical heaters and the like may be employed. The reactions generally are exothermic, however, and normally it is necessary to cool the system. To this end, cooling means such as cooling elements carrying cooling fluids may be present in the fluidized bed itself or surrounding the bed.

In fluid bed reactors operating at temperatures of about 400° C. and above, it is preferred to use a catalyst containing from 1.5 to about 20% by weight total of the catalytic metals calculated as the uncombined metals, the percent by weight being based on the total weight of uncombined metals and the carrier. This amount of catalytic metal facilitates fluidization and prevents any agglomeration of catalyst particles in the fluidized bed due to surface melting of the catalyst salts.

Alternatively, the reaction is carried out in a system in which the catalyst is in a fixed bed, and reactants are passed through or over it. The same general considerations apply as apply in the fluidized bed system in that it is necessary to provide heat in some stages and withdraw heat at others, and suitable heat exchange means must be provided.

The following examples are presented by way of illustration and are not to be considered as limiting the scope of the invention in any way.

EXAMPLE 1

Preparation of catalysts

One hundred thirteen grams of a microspheroidal silica gel carrier having a surface area of 600 m.$^2$/g., and average pore size of 67 A. and an average particle size of 54–65 microns (Grace Chemical Co., Grade 951, silica gel catalyst) was impregnated with 200 ml. of aqueous solution containing 7.2 g. of cupric chloride, 5.7 g. of potassium chloride, and 8.7 of cerous chloride hexahydrate. The impregnated carrier was heated at 200° C. for 6 hours and then placed in a muffle furnace for 6 hours at 400° C. until dry. The resultant catalyst contained, by weight, 2.5% copper, 2.3% potassium and about 2.5% cerium calculated as the uncombined metal, the percent by weight being based on the total weight of the uncombined metals and said carrier. The atomic ratio of cerium to copper was 0.475:1.

By replacing the cerous chloride hexahydrate of the above example with neodymium, zirconium, or didymium chloride similar catalysts can be made.

EXAMPLE 2

A copper potassium neodymium chloride catalyst was made containing 2.5% of each of the materials. A charge of 200 cc. of the catalyst was placed into a 1⅝″ O.D. glass reactor having a length of 24″. A gaseous feed containing a hydrocarbon mixture of methane and ethylene (mole ratio 1.0/1.0), chlorine and air in the mole ratio of 1.0/2.0/6.0 was subjected to an oxychlorination reaction in the presence of the catalyst at 435° C. The feed rates, equivalent to an average linear flow of 0.25 ft./sec., maintained the catalyst in an excellent fluidized state.

The effluent gases were collected and assayed. Approximately 87% of the chlorine (introduced as elemental chlorine) and 90% of the carbon was utilized, with 76% of chlorine being introduced being converted to chloroform, carbon tetrachloride and tri- and perchloroethylenes (mole ratio $C_1/C_2$ 1:1.3).

The conversion of carbon to carbon oxides was 10%.

Note that the molar ratio of $C_1$ to $C_2$ taken out of the reaction was lower than the molar ratio of the product fed to the reactor. This indicates either that the side reactions go first with the methane, that the methane converts in part to $C_2$ hydrocarbon, or that a combination of both factors are involved.

EXAMPLE 3

The same reactor and condition as in Example 2 except that the mole ratio of methane/ethylene was 2:1. The conversion of chlorine to halogenated hydrocarbons was 80% with 72% of the chlorine introduced converted to chloroform, carbon tetrachloride and tri- and perchloroethylenes (ratio $C_1/C_2$ 1.4:1); 11% of the carbon burned to carbon oxides.

EXAMPLE 4

The same reactor and conditions as in Example 2 except that the mole ratio of methane/ethylene was 1:2. The conversions of chlorine to halogenated hydrocarbons was 86% and conversion of carbon was 91% with 74% of the chlorine introduced converted into chloroform, carbon tetrachloride and tri- and perchloroethylenes (ratio $C_1/C_2$ 1:2.5); 9% of the carbon was burned to carbon oxides.

EXAMPLE 5

The same reactor and conditions as in Example 2 except that the third catalyst metal was cerium. The conversion of chlorine to product was 85%, and conversion of carbon to product was 89%, with 74% of chlorine introduced being converted into chloroform, carbon tetrachloride and tri- and perchloroethylenes (ratio $C_1/C_2$ 1:1.3); 11% of the carbon burned to carbon oxide.

EXAMPLE 6

The same reactor and conditions as in Example 2 except that the mole ratio of methane/ethylene was 3:1. The conversion of chlorine to halogenated hydrocarbons was 80% and conversion of carbon was 88% with 70% of the chlorine introduced converted into chloroform, carbon tetrachloride and tri- and perchloroethylenes (ratio $C_1/C_2$ 1:2.5); 12% of the carbon was burned to carbon oxides. Traces (<0.5%) of methane were detected in the vent gases.

Similar results have been obtained using zirconium chloride and didymium catalysts with the yields being somewhat poorer for these catalysts.

Example A for comparison—Straight methane

When Example 5 for example was repeated using straight methane as the feed, the conversion of chlorine was 70%; 20% of the carbon burned to carbon oxides; 9% of the carbon passed through as unreacted methane.

Obviously, the examples can be multiplied indefinitely without departing from the scope of the invention defined in the claim.

What is claimed is:

1. In the process of carrying out an oxychlorination reaction which comprises heating a mixture containing methane, oxygen and a member selected from the group consisting of chlorine and hydrogen chloride to a temperature of from 325–600° C. in the presence of a catalyst consisting of copper chloride, potassium chloride and a third metal chloride selected from the group consisting of neodymium chloride, didymium chloride, cerium chloride and zirconium chloride on a carrier, the improvement which comprises using as the feed stock a mixture of methane with a $C_2$ hydrocarbon of the group consisting of ethane and ethylene, the mole ratio of methane to $C_2$ hydrocarbon being from about 0.25:1 to 3:1.

References Cited

UNITED STATES PATENTS

| | | |
|---|---|---|
| 2,284,482 | 5/1942 | Vaughan et al. |
| 3,210,431 | 5/1965 | Engel. |
| 3,267,160 | 8/1966 | McGreevy et al. |
| 3,360,483 | 12/1967 | Diamond et al. |

BERNARD HELFIN, Primary Examiner

J. BOSKA, Assistant Examiner

U.S. Cl. X.R.

260—654